United States Patent
MacNeil et al.

(10) Patent No.: US 9,854,930 B1
(45) Date of Patent: Jan. 2, 2018

(54) FOLDABLE MAT

(71) Applicant: MacNeil IP LLC, Bolingbrook, IL (US)

(72) Inventors: David F. MacNeil, Hinsdale, IL (US); Frederick W. Masanek, Jr., Barrington, IL (US); Stephen Lipa, Mokena, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 15/589,508

(22) Filed: May 8, 2017

Related U.S. Application Data

(63) Continuation of application No. 15/200,157, filed on Jul. 1, 2016, now Pat. No. 9,675,151.

(51) Int. Cl.
*A45C 7/00* (2006.01)
*A47G 29/00* (2006.01)
*F16M 13/00* (2006.01)

(52) U.S. Cl.
CPC ............... *A47G 29/00* (2013.01); *A45C 7/00* (2013.01); *F16M 13/00* (2013.01); *F16M 2200/08* (2013.01)

(58) Field of Classification Search
CPC ............ F16M 13/00; F16M 2200/08; A45C 2007/0004; A45C 13/001; A45C 7/00; A45F 4/02; B65D 1/34
USPC ........................................ 248/346.3; 294/1.1
See application file for complete search history.

(56) References Cited

U.S. PATENT DOCUMENTS

| | | | |
|---|---|---|---|
| 1,731,547 A | 10/1929 | Stansbury | |
| 2,667,353 A * | 1/1954 | Lanice | A63F 3/0023 190/901 |
| 3,253,293 A * | 5/1966 | Elmer | A47G 27/0225 15/118 |
| 3,314,464 A | 4/1967 | Veilleux | |
| 4,164,275 A * | 8/1979 | Davis | A45C 9/00 190/2 |
| 4,296,788 A * | 10/1981 | Slater | A01G 1/12 294/156 |
| 4,466,516 A * | 8/1984 | Sicoli | A45F 4/06 190/2 |
| 4,489,815 A * | 12/1984 | Martinez | A45C 9/00 190/1 |
| 4,546,507 A * | 10/1985 | Weinstein | A45C 3/10 190/2 |
| 4,671,393 A * | 6/1987 | Rainey | A45C 3/10 190/1 |

(Continued)

OTHER PUBLICATIONS

Image from www.Purseprops.com website downloaded on Jun. 30, 2016.

*Primary Examiner* — Nkeisha Smith
(74) *Attorney, Agent, or Firm* — Perkins IP Law Group LLC; Jefferson Perkins

(57) ABSTRACT

A foldable mat has a flat flexible base portion with a margin and has finger tabs integrally molded with the base portion out of a polymeric material. The finger tabs extend upward from the base portion. The finger tabs can be grasped and pulled upward to allow the mat to fold so that the bottom surface halves of the mat fold inward on each other, masking the potentially contaminated bottom surface of the mat from contact with anything else. The mat can then be stored in a folded condition.

18 Claims, 6 Drawing Sheets

(56) References Cited

U.S. PATENT DOCUMENTS

| | | | | |
|---|---|---|---|---|
| 4,999,863 | A * | 3/1991 | Kane | A45C 9/00 190/2 |
| 5,035,013 | A * | 7/1991 | Bloom | A47D 13/063 190/1 |
| 5,110,219 | A * | 5/1992 | Lopes | A45C 3/10 190/2 |
| 5,370,460 | A * | 12/1994 | Nelson | A45F 4/02 383/4 |
| 5,577,730 | A * | 11/1996 | Vannozzi, Sr. | A63F 3/0023 206/315.1 |
| 5,653,318 | A | 8/1997 | Field | |
| 6,053,634 | A * | 4/2000 | Kay | B65D 33/06 190/901 |
| 6,200,661 | B1 * | 3/2001 | Daniels | A47C 27/0225 4/581 |
| 6,212,711 | B1 * | 4/2001 | Gilmour | A45C 9/00 190/1 |
| 6,321,401 | B1 * | 11/2001 | Fleming | A47C 27/001 5/420 |
| 6,493,891 | B1 * | 12/2002 | Livingston | A45C 3/10 150/110 |
| D487,551 | S | 3/2004 | Lee | |
| 7,485,071 | B2 * | 2/2009 | Edwards | A63B 21/4037 482/23 |
| 7,517,013 | B1 * | 4/2009 | Lowe | A47C 7/742 297/180.11 |
| 7,520,010 | B2 * | 4/2009 | Welch | A47D 5/006 190/1 |
| 7,789,444 | B1 * | 9/2010 | Younke | A01M 31/06 294/151 |
| 8,109,557 | B1 * | 2/2012 | Salinas | F41H 5/16 280/770 |
| 8,251,340 | B2 * | 8/2012 | Webb | A47G 19/10 248/205.1 |
| D685,593 | S | 7/2013 | Boyer | |
| 2008/0118671 | A1 * | 5/2008 | Bienkiewicz | A47C 27/001 428/12 |
| 2008/0245947 | A1 * | 10/2008 | Webb | A47G 19/10 248/683 |
| 2009/0179446 | A1 * | 7/2009 | Ahlers | A45C 9/00 294/137 |
| 2014/0069970 | A1 * | 3/2014 | Thomas, Jr. | A45F 3/14 224/257 |
| 2014/0154474 | A1 * | 6/2014 | Robbins, III | A47G 27/0206 428/167 |
| 2014/0251866 | A1 | 9/2014 | Smallman et al. | |
| 2015/0113730 | A1 * | 4/2015 | Wentland | A47G 9/062 5/417 |
| 2015/0173473 | A1 * | 6/2015 | Jenkins | A45C 9/00 190/1 |
| 2016/0129299 | A1 * | 5/2016 | Newman | A63B 21/4037 482/142 |
| 2016/0235225 | A1 * | 8/2016 | Lehovetzki | A47G 9/062 |

* cited by examiner

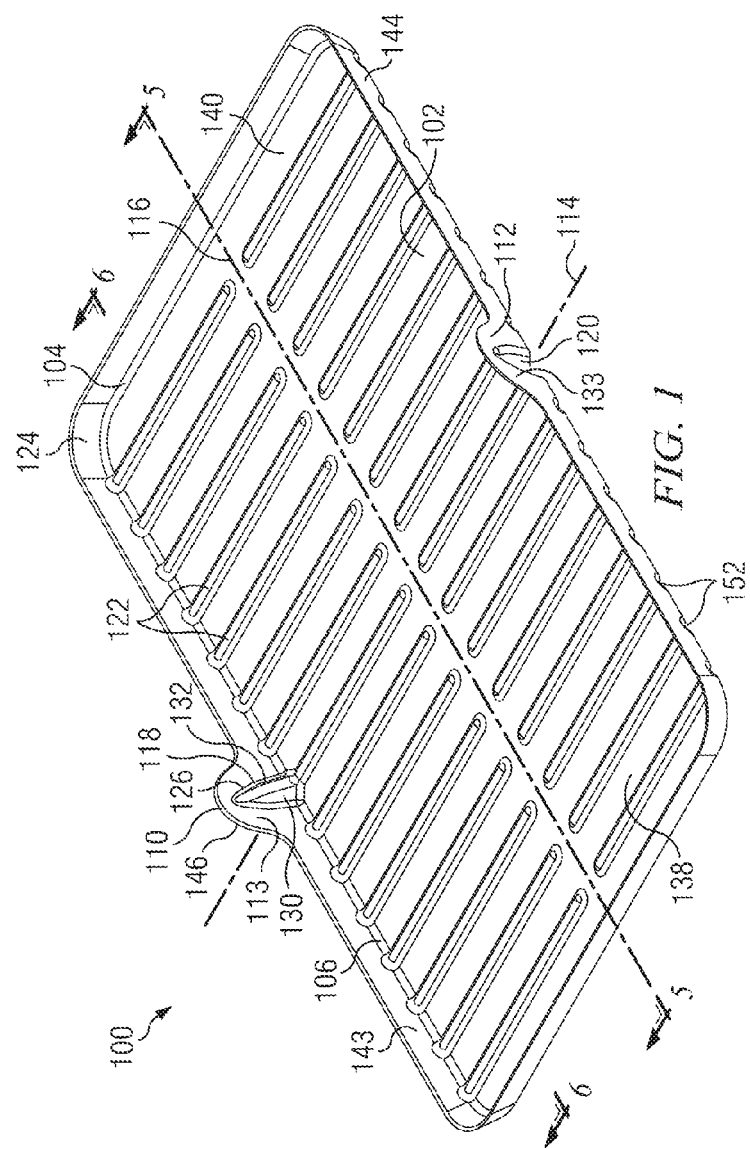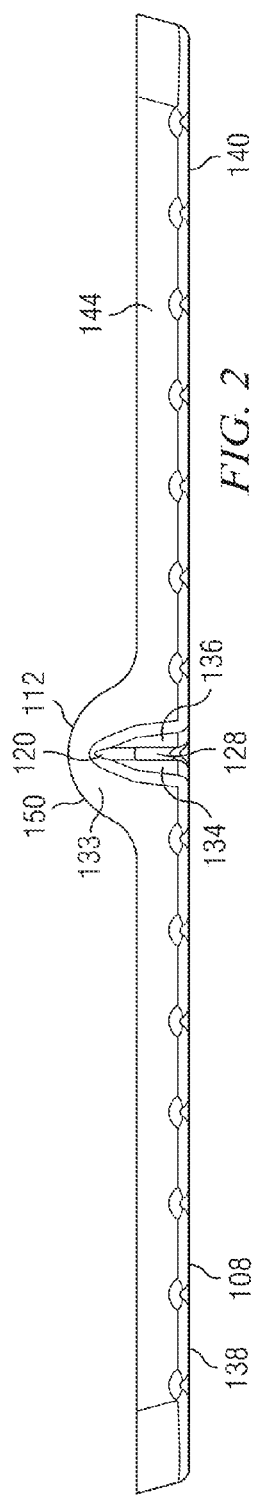

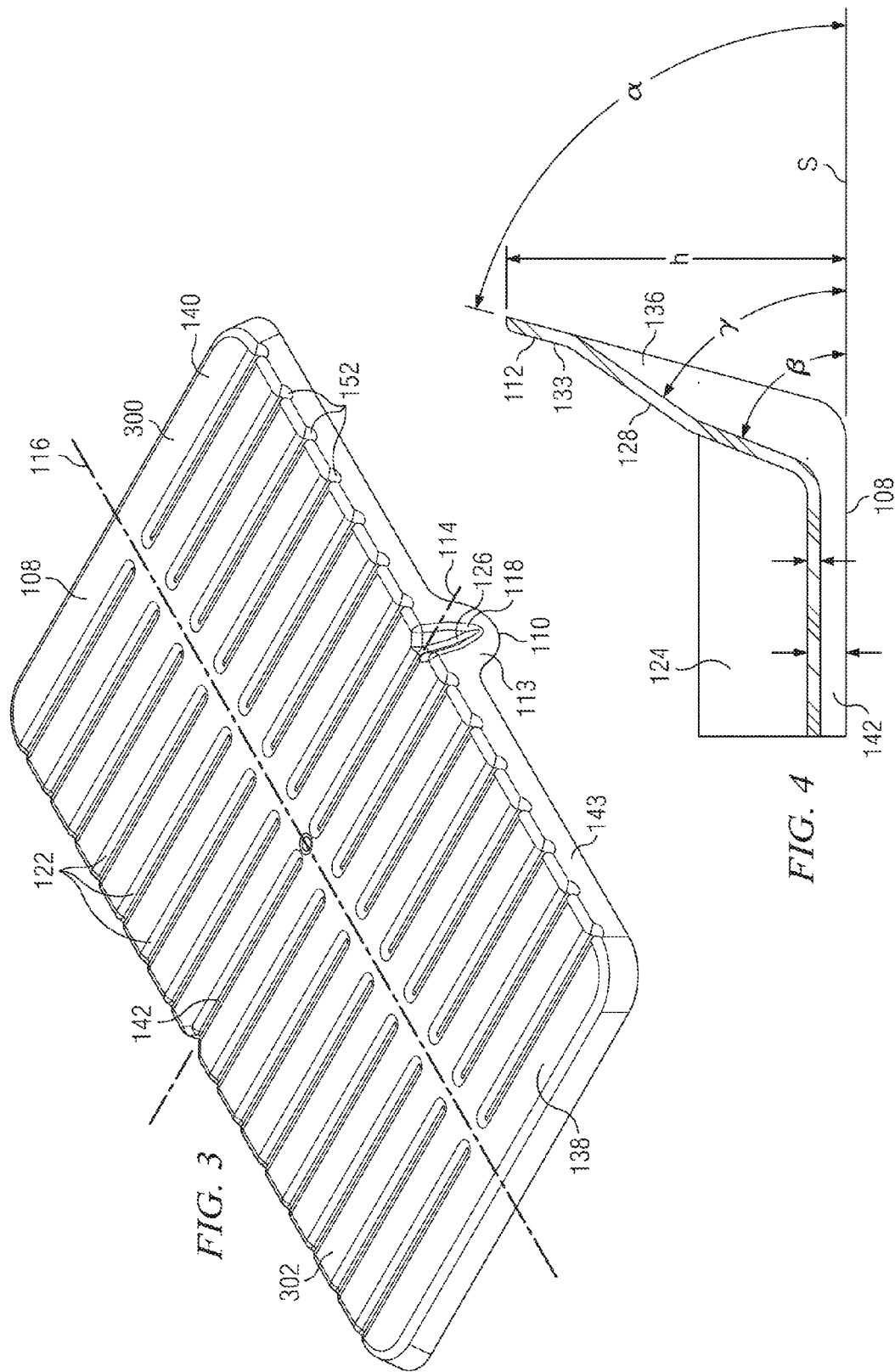

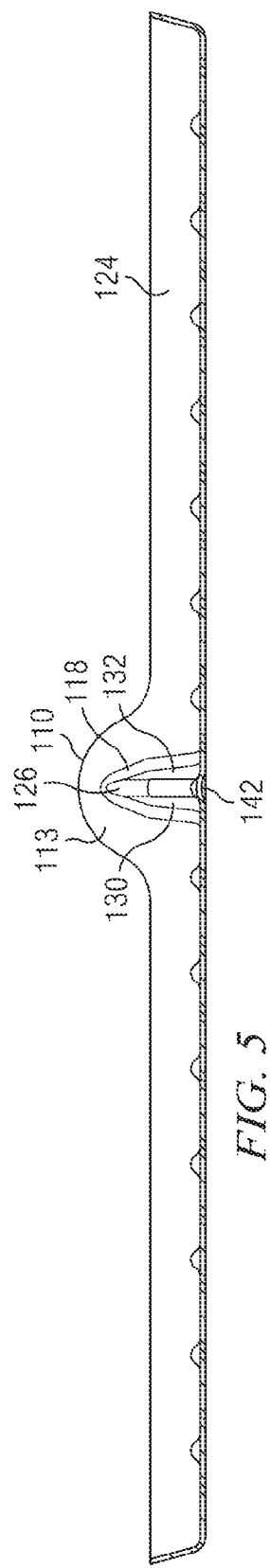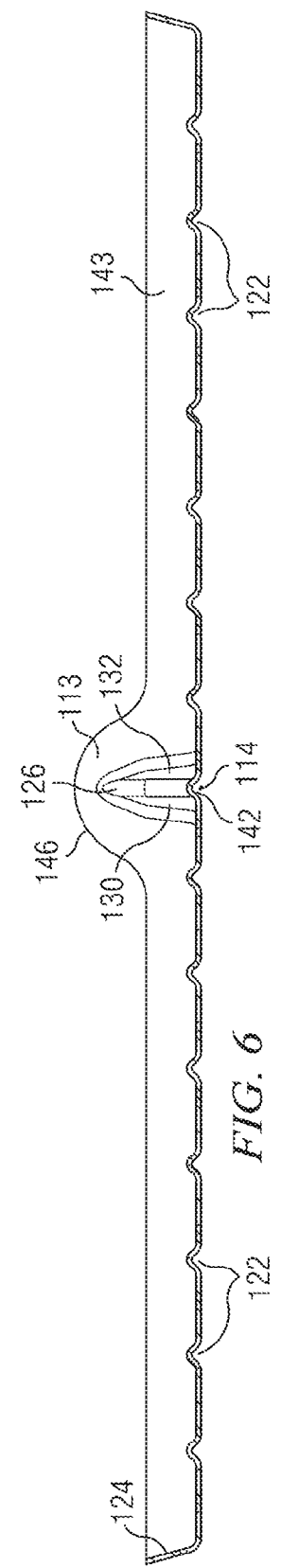

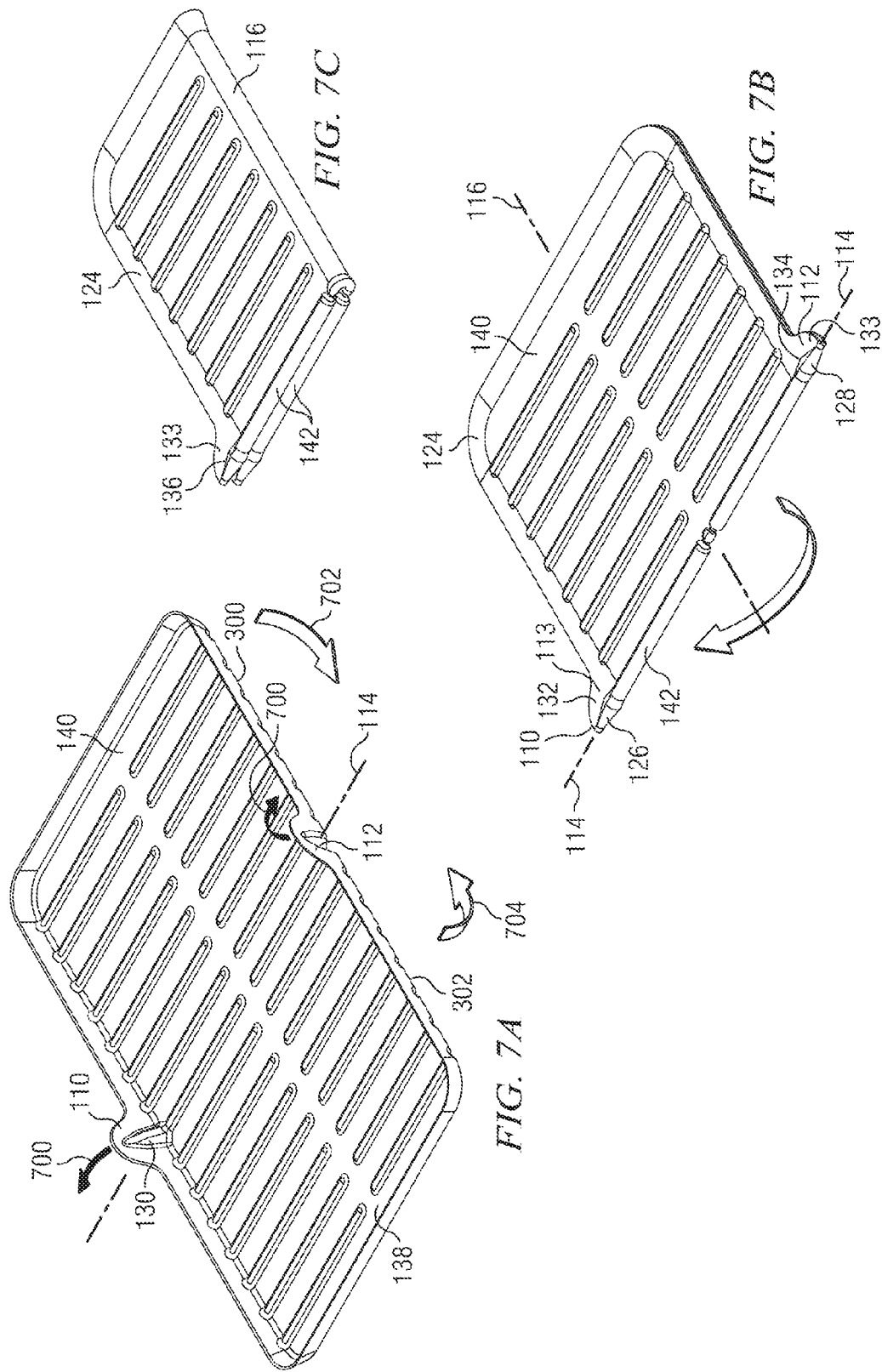

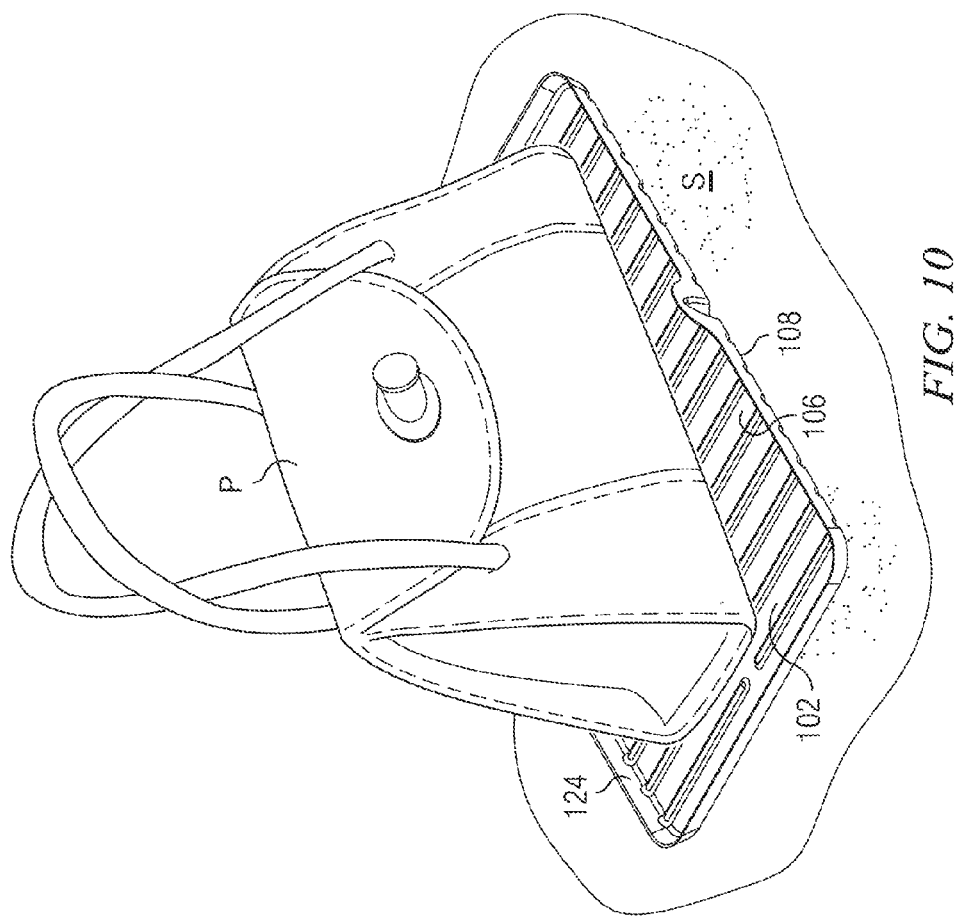
FIG. 10
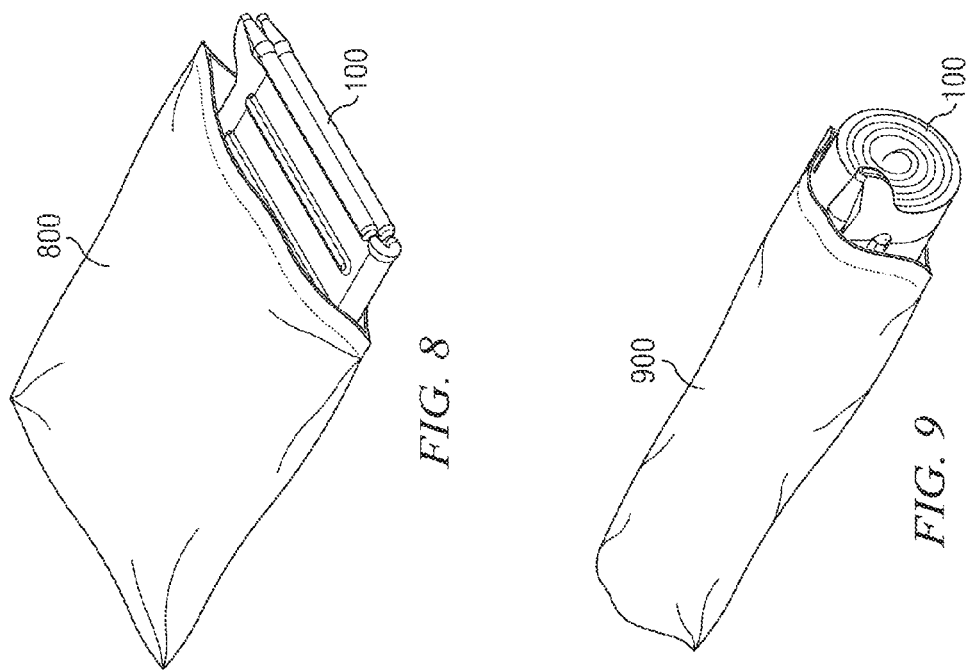
FIG. 8
FIG. 9

FOLDABLE MAT

RELATED APPLICATIONS

This application is a continuation of copending U.S. patent application Ser. No. 15/200,157, filed Jul. 1, 2016 and owned by the Applicant hereof. The entire disclosure and drawings of the last said application are fully incorporated herein by reference.

BACKGROUND OF THE INVENTION

The ground or floor is generally an unsanitary surface. People typically carry around bags or other articles and need to set them down. Women's handbags tend to be placed where the handbag is exposed to dirt, rough surfaces, spilled liquids or other waste. In particular, public places especially restrooms present a distinct challenge. The unprotected bottom of the handbag can become stained or damaged or covered with bacteria. Placing a bag on a rough surface can cause abrasion to the bottom of the bag to sustain wear and tear. The conventional solution is to attempt to hang or suspend the article to be protected or to simply have the article rest on the dirty surface.

Some handbag protection devices currently on the market are made of cloth. These cloth covers do not typically protect the item from wet surfaces. In addition, after using the cloth, the cloth itself becomes contaminated and the dirty cloth surface must be handled in order to remove the cloth cover from the article. Other devices include rigid fold out trays that are stands that again involve handling the contaminated surfaces in order to restow the device after use. These trays are made of a hard plastic material with an inability to conform to the shape of the bag it is in, making it cumbersome and difficult to stow.

SUMMARY OF THE INVENTION

According to one aspect of the invention, there is provided a foldable mat or tray which can be unfolded and placed on a surface and an article placed on top of the unfolded mat to protect the article from the surface. The mat is then removed from the surface, and refolded with the area of the foldable mat that contacted the contaminated surface folded inward upon itself.

In one embodiment, a foldable mat or tray has a flat flexible base portion with a peripheral margin. The base portion substantially conforms to a plane in an unfolded condition. The base portion has a top surface and a bottom surface opposed to the top surface. A first finger tab and a second finger tab, opposed to the first finger tab, are integrally molded with the base portion out of a polymeric material such as a thermoplastic elastomer, and are disposed on the margin to extend, in an unfolded condition, upwardly from the top surface. A fold line bisects the base portion into first and second halves and has two opposed ends, the margin being bilaterally symmetrical around the fold line. Each end of the fold line terminates at a respective finger tab. The base portion folds on the fold line to a folded condition by a user grasping and upwardly pulling the opposed finger tabs, such that when folded the first half of the bottom surface mates with the second half of the bottom surface.

In one embodiment, the finger tabs each have an inward facing surface with a substantially triangular indentation extending inwardly from the inward facing surface forming a gusset.

In one embodiment, the fold line divides the foldable mat into a forward portion and a rearward portion. Each finger tab includes a hollow gusset that has a ridge upwardly extending from an end of the first fold line when the base portion is in an unfolded condition. A first triangular wall of the gusset extends forwardly from the ridge line and upwardly from the top surface of the base portion. A second triangular wall of the gusset adjoins the first wall of the gusset and extends rearwardly from the ridge line and upwardly from the top surface. The ridge lines become colinear with the fold line, and the first wall of the gusset collapses onto the second wall of that gusset, when the base portion (and mat) are folded to a folded condition.

In one embodiment the finger tabs extend from the base at about a 65 to 85 degree angle when in an unfolded condition. When the user seeks to fold the mat along the fold line, the user pulls each finger tab upward and outward.

In one embodiment, the base portion of the foldable mat has raised ribs. In one embodiment, at least a central one of these raised ribs is hollow and the central rib is coincidental with the fold line. The raised ribs may be interrupted to form a second fold line that is at an angle, such as 90 degrees, to the first fold line.

In one embodiment, the foldable mat has a raised perimeter wall upwardly extending from the margin. Ends of the spaced-apart hollow parallel ribs may terminate at the wall to promote an upright condition when the base portion is in an unfolded condition.

In one embodiment, the mat may contain antimicrobial additives, such as silver particles.

In a further aspect of this invention, there is provided a method of article protection. A mat is molded of a polymeric material to have a flat flexible base portion and opposed first and second flexible finger tabs that, when the mat is in an unfolded condition, extend upwardly from the base portion. The finger tabs are at opposite ends of a fold line. The mat may be provided to a user in a folded condition. The user unfolds the folded mat and places a bottom surface of the unfolded mat on a second surface from which the article is to be protected. The user then places the article, such as a purse, on a top surface of the unfolded mat. Later, when the article is to be used or the user wishes to leave the area at which the second surface is located, the user removes the article from the top surface of the mat. The user then grasps the mat at the finger tabs and pulls the finger tabs upward. This causes the first half of the bottom surface of the mat to fold onto the second half of the bottom surface around the fold line, mutually masking both possibly contaminated bottom surface halves from contact with anything else. Thereafter, the folded mat may be stored as folded only once, or as folded a second time into quarters, or rolled. Where the article to be protected is a purse, handbag or the like, the mat, preferably as stowed in a case or pouch, may be placed inside the article.

In further uses of this invention, the foldable mat may be used to protect a person from a dirty, wet, or cold surface. For example, the foldable mat could be placed on bleacher seats to protect the user's clothing, or could be used on grassy or muddy areas to protect the user from the dirty or wet areas. The foldable mat could provide a clean, dry surface on which to change footwear, diapers, clothing and the like.

BRIEF DESCRIPTION OF THE DRAWINGS

Further aspects of the invention and their advantages can be discerned in the following detailed description, in which like characters denote like parts and in which:

FIG. 1 is an isometric view of one embodiment of a foldable mat according to the invention;

FIG. 2 is an elevational side view of the embodiment shown in FIG. 1;

FIG. 3 is an isometric view of the bottom of the embodiment shown in FIG. 1;

FIG. 4 is a detailed sectional view taken through a finger tab along a fold line;

FIG. 5 is a longitudinal sectional view taken substantially along line 5-5 in FIG. 1;

FIG. 6 is a longitudinal sectional view taken substantially along line 6-6 in FIG. 1;

FIGS. 7A-7C are views showing successive steps of folding the flexible mat according to one embodiment of the invention;

FIG. 8 is a view showing the insertion of a twice-folded mat into a storage pouch according to one embodiment of the invention;

FIG. 9 is a view showing the insertion of a folded and rolled mat into a storage pouch according to a second embodiment of the invention;

FIG. 10 is a view showing an article placed on the mat and protected from the surface beneath the mat according to one embodiment of the invention.

DETAILED DESCRIPTION

Figure 11:
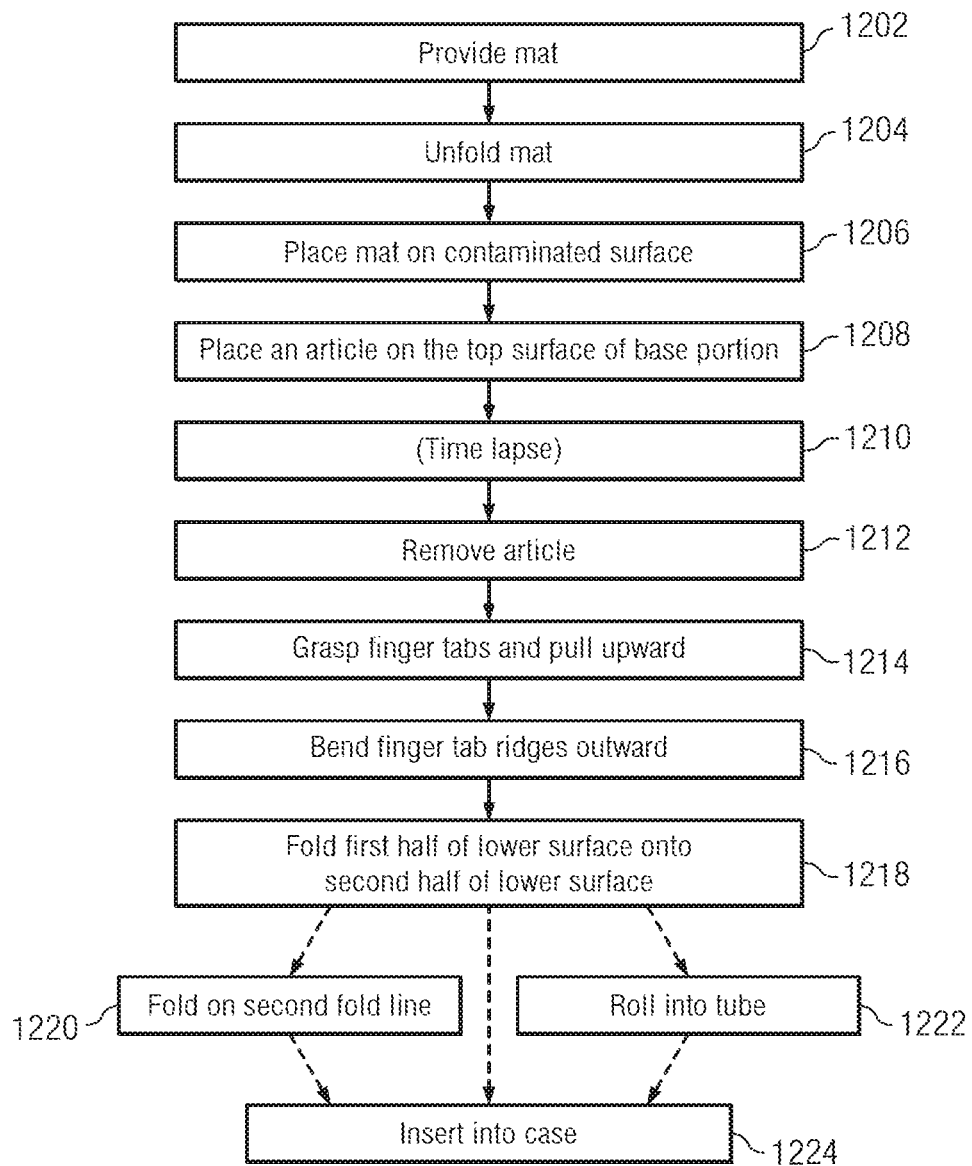
FIG. 11 is a schematic block diagram showing a method of unfolding, placing, refolding and storing the flexible mat according to one embodiment of the invention.

A top isometric view of one commercial embodiment is shown in FIG. 1. A foldable mat indicated generally at 100 is shown in an unfolded or unfurled form or condition. The foldable mat 100 has a flat flexible base portion 102 with a peripheral margin 104, a top surface 106, and a bottom surface 108 as shown in FIG. 3, opposed to the top surface 106. The mat 100 may take a generally rectangular form as shown, although other shapes could be employed, so long as they are bilaterally symmetrical around the first fold line (described below).

Extending upwardly from the top surface 106 is a first finger tab 110 and a second finger tab 112, opposed to the first finger tab 110 so as to be separated from finger tab 110 by an entire width of the base portion 102. The flexible finger tabs 110, 112 are integrally molded with the base portion 102 of a polymeric material and are disposed on the margin 104.

Finger tab 110 includes a flat, peripheral portion 113 that surrounds, in upward, forward and rearward directions, a first gusset 118. The first gusset 118 is substantially triangular in shape and in general protrudes inwardly from the peripheral portion 113. Gusset 118 is hollow and may have a first substantially triangular wall 130 and a second substantially triangular wall 132. Gusset walls 130, 132 adjoin each other along a first ridge line 126. An interior face of wall 130 faces forwardly, while an interior face of wall 132 faces rearwardly. The finger tab 110 may upwardly terminate in a convexly curved margin 146.

Similarly, finger tab 112 has a flat, peripheral portion 133 that surrounds, in upward, forward and rearward directions, a second gusset 120. The second gusset 120 is substantially triangular in shape and in general protrudes inwardly from the peripheral portion 133, in opposition to the direction of protrusion of gusset 118. Gusset 120 is hollow and may have a first substantially triangular wall 134 (FIG. 2) and a second substantially triangular wall 136. Walls 134, 136 are joined by a second ridge line 128. An interior face of wall 134 faces forwardly, while an interior face of wall 136 faces rearwardly. A top margin 150 of the finger tab 112 may be convexly curved. Gusset 120 may be a mirror image of gusset 118. More generally, gussets 118 and 120 may have sides that are symmetrical about their respective ridge lines 126, 128.

A first fold line 114 bisects the base portion 102 symmetrically into a first or forward portion 138 and a second or rearward portion 140. One end of the first fold line 114 terminates at finger tab 110, where it joins ridge line 126, and the other opposed end of the first fold line 114 terminates at finger tab 112, where it joins ridge line 128.

The walls 130, 132 of the first gusset 118 are upstanding and at an angle to each other when base portion 102 (and mat 100) are in an unfolded position, as shown in FIGS. 1-7A. Ridge line 126 is in a vertical plane with fold line 114 but at a considerable angle thereto (such as 75 degrees). Similarly, and when the mat 100 is in an unfolded condition, ridge line 128 is in this vertical plane with ridge line 126 and fold line 114, but at a considerable angle, such as 75 degrees, to the fold line 114.

In order to provide additional protection from liquids or any contaminant that could come into contact with the article to be protected (see FIG. 10), in one embodiment mat 100 includes a perimeter wall 124 that, when base portion 102 is in an unfolded condition, extends upward from the margin 104. In one embodiment, one longitudinal section 143 of wall 124 may be coplanar with flat portion 113 of finger tab 110, while the other, opposed longitudinal section 144 of the wall 124 may be coplanar with flat portion 133 of finger tab 112. In one embodiment, all portions of wall 124 make about a 75 degree angle to the base portion 102 when the base portion 102 is in an unfolded condition. The height of the perimeter wall 124 may be in the range of ⅛ to ⅝ inches tall, as measured vertically from top surface 106. Finger tabs 110 and 112 usually will be taller than this, and may be in the range of ⅝-to 1⅜ inches tall as measured vertically from top surface 106, and/or ½ to ¾ inches taller than a top margin of the wall 124.

In one embodiment, a set of straight, spaced-apart, parallel ribs 122 are molded into the base portion 102. In the illustrated embodiment these ribs 122 run parallel to the fold line 114. The ribs 122 elevate the article off of the top surface 106 of the base portion 102, providing additional protection to the article. The ribs 122 also provide rigidity in a side-to-side direction to the base portion 102 for additional stability. In one embodiment, the ribs 122 are discontinuous across the base 102 at the centers of their lengths, thereby forming a second fold line 116 (FIG. 3) where base portion 102 will preferentially fold.

In one embodiment, the ribs 122 are hollow and one end 152 of each of them (best seen in FIG. 3) terminates on longitudinal wall section 143 or on longitudinal wall section 144. In this manner, the rib ends 152 reinforce wall sections 143 or 144 and tend to urge the wall sections 143 or 144 to remain upright when the mat 100 is in an unfolded condition. Gussets 118, 120 also tend to keep the wall sections 143, 144 upright in the unfolded condition.

As illustrated in FIG. 4, in an unfolded condition the finger tabs 110, 112 can be at an angle that is less than 90° from horizontal. Angle α, the angle formed from the outside surface of wall 124 and bottom surface 108, can typically range from about 65° to about 85°. Angle β, the angle formed from the margin 104 and bottom surface 108, can typically range from about 60° to about 80°. Angle γ, the angle formed between the outside edge of the second ridge line 128 and bottom surface 108, can typically range from about 45° to about 65°. In one embodiment of the invention, the height of the hollow rib 122 as seen in sectional view in FIG. 4 can be between about 0.080 and about 0.160 in.

As best seen in FIG. 3, a straight, hollow center rib 142 may be located on first fold line 114. Rib 142 functionally defines the ends of first fold line 114 where they terminate at respective ridge lines 126, 128. This promotes the folding of mat 100 along this line. The bottom surface 108 of the base portion 102 is bisected by fold line 114 into a rearward bottom surface 300 and a forward bottom surface 302.

Sectional views of the foldable mat are shown in FIGS. 5 and 6. As is shown in these views, all components of the mat are molded to a similar nominal thickness such as 0.040 in. This makes the mat capable of flexure and reconfiguration in desired ways.

FIGS. 7A and 7B illustrate what happens when mat 100 is folded along line 114. A user grasps finger tabs 110, 112 and pulls upward and preferably outward, in the direction of arrows 700. The illustrated positioning of the finger tabs 110, 112 allows the user to grasp them easily and to prevent the finger tabs (or the user's fingers) from touching any contaminated surface. Pulling finger tabs 110, 112 upwardly and outwardly causes the base portion 102 to fold along first fold line 114. The bottom surface 300 of rear portion 140 of the base 102 will rotate downwardly around fold line 114, in the direction of arrow 702. The bottom surface 302 of forward portion 138 of the base 102 will downwardly rotate around the fold line 114, in the direction of arrow 704. This folding will continue until the possibly contaminated bottom surfaces 300 and 302 meet, masking each other from contact with anything else. For this reason, it is preferred that the periphery of bottom surface 300 be a mirror image of the periphery of bottom surface 302.

While this is happening, the structures of mat 100 that stand upward when mat 100 is an unfolded condition collapse and flatten out. As shown in FIG. 7B, ridge lines 126 and 128 rotate downward until they become collinear with the first fold line 114. Perimeter wall 124 flattens out and sections of it become substantially coplanar with rear base portion 140 or front base portion 138. The respective peripheral flat portions 113, 133 of finger tabs 110, 112 likewise become coplanar with base portions 138 or 140. Gusset wall 130 collapses onto and becomes parallel to gusset wall 132, while gusset wall 134 collapses onto and becomes parallel to gusset wall 136. The result is a once-folded configuration seen in FIG. 7B, in which the mat material substantially conforms to one of two parallel and adjacent planes.

The mat 100 may be stored this way, or folded a second time along longitudinal fold line 116 to become more compact and easier to transport (FIG. 7C). In an alternative embodiment, the mat 100 is rolled to form a tube after the first fold along line 114 (see FIG. 9).

The base 102, wall 124 and finger tabs 110, 112 are sufficiently flexible that they are able to be folded in halves and preferably into quarters. Typically the material from which mat 100 is made is a thermoplastic elastomer material (TPE). Mat 100 may be injection molded or thermoformed, the latter being an option because all parts of it substantially conform to a nominal thickness in the range of 0.030 to 0.050 in. The nominal thickness can be 0.040 in. In a preferred embodiment, the TPE contains antimicrobial additives. These additives can consist of or include silver particles. Another aspect of the foldable mat is that it can be washed in a sink or dishwasher.

After the foldable mat 100 is folded along the first fold line 114 or optionally folded again along the second fold line 116, the foldable mat can be placed into a pouch or case 800, 900 for storage (FIGS. 8 and 9). The pouch or case can then be placed inside the article to be protected (if the character of the article permits this) and easily transported for reuse or cleaning.

As shown in FIG. 11, in a method of article protection according to the invention, a folded mat 100 is provided to the user, at step 1202. The mat is unfolded, step 1204, and placed on a possibly contaminated surface S (step 1206). The article (such as a handbag or purse P; see FIG. 10) to be protected is placed on the top surface 106 of the base portion 102, step 1208. After a period of time (step 1210) the article is removed from the base portion (step 1212). This may happen because the user wishes to use the article or to leave the area at which surface S is located. To fold the mat 100, at step 1214 the user grasps finger tab 110 and finger tab 112 and pulls upward and preferably outward. This causes (1216) tab ridges 126 and 128 to rotate downward to become collinear with fold line 114 and the gusset walls 130, 132; 134, 136 to collapse upon themselves. At step 1218, the first half 300 of lower surface 108 is folded onto the second half 302 of lower surface 108, masking any contamination present on these surfaces. The folded mat 100 can be inserted directly into a pouch or case (step 1224). The pouch or case can then be placed into purse P. Alternatively, the folded mat 100 can be folded on the second fold line 116 (step 1220) and the folded mat can be inserted into a pouch or case 800 (FIG. 8). Alternatively the folded mat 100 can be rolled (step 1222) and then inserted (step 1224) into a pouch or case 900 (FIG. 9). After either step the pouch or case 800, 900 may then be placed in article P, if the article P to be protected is itself a container.

The foldable mat is generally a size that when folded will fit inside of purse P or like article it is protecting. When folded, the article is protected from the entire underside of the folded mat. In this way the user does not interact with any contaminated surface, as it is masked off from contact by being folded on itself.

In summary, a foldable mat for protecting articles is provided. The foldable mat has finger tabs that when grasped allow the mat to fold inward along a fold line protecting the user from coming into contact with the possibly contaminated lower surface of the mat.

While illustrated embodiments of the present invention have been described and illustrated in the appended drawings, the present invention is not limited thereto but only by the scope and spirit of the appended claims.

We claim:

1. A foldable mat, comprising:
   a flat flexible base portion molded from a polymeric material, the base portion substantially conforming to a plane in an unfolded condition, the base portion having a top surface, a bottom surface opposed to the top surface, and a peripheral margin;
   a first finger tab and a second finger tab opposed to the first finger tab, the finger tabs integrally molded with the base portion out of the polymeric material and disposed on the margin, the finger tabs extending upwardly from the top surface of the base portion when the mat is in the unfolded condition; and
   a fold line bisecting the base portion and having two ends, the margin being bilaterally symmetrical around the fold line, the fold line bisecting the bottom surface into a first half and a second half, each end of the fold line terminating at a respective finger tab, the base portion foldable on the fold line to a folded condition by a user grasping and upwardly pulling the opposed finger tabs, such that when folded the first half of the bottom surface mates with the second half of the bottom surface.

2. The foldable mat of claim 1, wherein the finger tabs each have an inward facing surface with a substantially triangular indentation extending from the inward facing surface, forming a gusset.

3. The foldable mat of claim 1, wherein each finger tab is symmetrical about a vertical plane including the fold line, first and second sides of each finger tab folding and collapsing on each other when the base portion is folded to a folded condition.

4. The foldable mat of claim 1, wherein the foldable mat is integrally molded of a thermoplastic elastomer.

5. The foldable mat of claim 1, wherein the foldable mat further comprises antimicrobial additives.

6. The foldable mat of claim 5, wherein the antimicrobial additives include silver particles.

7. The foldable mat of claim 1, wherein the base portion is substantially rectangular in shape.

8. The foldable mat of claim 1, wherein the base portion and the finger tabs are molded to a similar nominal thickness.

9. A foldable mat, comprising:
 a flat flexible base portion molded from a polymeric material, the base portion substantially conforming to a plane in an unfolded condition, the base portion having a top surface, a bottom surface opposed to the top surface, and a peripheral margin;
 a first finger tab and a second finger tab opposed to the first finger tab, the finger tabs integrally molded with the base portion out of the polymeric material and disposed on the margin, the finger tabs extending upwardly from the top surface of the base portion when the mat is in the unfolded condition; and
 a fold line bisecting the base portion and having two ends, the margin being bilaterally symmetrical around the fold line, the fold line bisecting the bottom surface into a first half and a second half, each end of the fold line terminating at a respective finger tab, the base portion foldable on the fold line to a folded condition by a user grasping and upwardly pulling the opposed finger tabs, such that when folded the first half of the bottom surface mates with the second half of the bottom surface, the base portion having an elongate raised center rib disposed on the fold line, an interruption in the center rib forming a second fold line at an angle to said fold line.

10. The foldable mat of claim 9, wherein the angle is 90 degrees.

11. A foldable mat comprising:
 a flat flexible base portion molded from a polymeric material, the base portion substantially conforming to a plane in an unfolded condition, the base portion having a top surface, a bottom surface opposed to the top surface, and a peripheral margin;
 a first finger tab and a second finger tab opposed to the first finger tab, the finger tabs integrally molded with the base portion out of the polymeric material and disposed on the margin, the finger tabs extending upwardly from the top surface of the base portion at an angle in the range of about 65 to about 85 degrees when the mat is in the unfolded condition; and
 a fold line bisecting the base portion and having two ends, the margin being bilaterally symmetrical around the fold line, the fold line bisecting the bottom surface into a first half and a second half, each end of the fold line terminating at a respective finger tab, the base portion foldable on the fold line to a folded condition by a user grasping and upwardly pulling the opposed finger tabs, such that when folded the first half of the bottom surface mates with the second half of the bottom surface.

12. A method of protecting an article, comprising the steps of:
 integrally molding a mat from a polymeric material to have, in an unfolded condition, a flexible flat base portion and opposed flexible first and second finger tabs that extend upwardly from the base portion;
 folding the mat along a fold line extending between the finger tabs to provide a folded mat;
 unfolding the folded mat;
 placing a bottom surface of the unfolded mat on a second surface from which the article is to be protected;
 placing the article on a top surface of the unfolded mat;
 later removing the article from the top surface of the unfolded mat,
 grasping the mat at the finger tabs and pulling the finger tabs upward; and
 responsive to the step of grasping, folding a first half of the bottom surface of the mat onto a second half of the bottom surface of the mat around the fold line.

13. The method of claim 12, and further including the step of:
 after said step of folding the first half of the bottom surface of the mat onto the second half of the bottom surface of the mat, inserting the folded mat into a case.

14. The method of claim 12, and further including the step of:
 after said step of folding the first half of the bottom surface of the mat onto the second half of the bottom surface of the mat, further folding said mat into quarters by folding said mat on a second fold line disposed at an angle to said fold line.

15. The method of claim 12, and further including the step of:
 after said step of folding the first half of the bottom surface of the mat onto the second half of the bottom surface of the mat, rolling the mat into a tube.

16. The method of claim 15 and further including the step of:
 inserting the tube into a case.

17. The method of claim 12, further comprising the step of integrally molding the base portion and the finger tabs to a similar nominal thickness.

18. A method of protecting an article, comprising the steps of:
 integrally molding a mat from a polymeric material to have, in an unfolded condition, a flexible flat base portion and opposed flexible first and second finger tabs that extend upwardly from the base portion;
 folding the mat along a fold line extending between the finger tabs to provide a folded mat;
 unfolding the folded mat;
 placing a bottom surface of the unfolded mat on a second surface from which the article is to be protected;
 placing the article on a top surface of the unfolded mat;
 later removing the article from the top surface of the mat,
 grasping the mat at the finger tabs and pulling the finger tabs upward;
 responsive to the step of grasping, folding a first half of the bottom surface of the mat onto a second half of the bottom surface of the mat around the fold line; and responsive to the step of grasping, folding each of the finger tabs into mating halves that substantially lie in planes parallel to each other when the mat is in a folded condition.

\* \* \* \* \*